US007458407B2

(12) United States Patent
Takahashi et al.

(10) Patent No.: US 7,458,407 B2

(45) Date of Patent: Dec. 2, 2008

(54) THERMAL ACTIVATION DEVICE

(75) Inventors: Masanori Takahashi, Chiba (JP); Minoru Hoshino, Chiba (JP); Yoshinori Sato, Chiba (JP)

(73) Assignee: Seiko Instruments Inc. (JP)

( * ) Notice: Subject to any disclaimer, the term of this patent is extended or adjusted under 35 U.S.C. 154(b) by 352 days.

(21) Appl. No.: 11/054,501

(22) Filed: Feb. 9, 2005

(65) Prior Publication Data

US 2005/0189076 A1 Sep. 1, 2005

(30) Foreign Application Priority Data

Feb. 26, 2004 (JP) ............................ 2004-050988

(51) Int. Cl.
*B32B 41/00* (2006.01)

(52) U.S. Cl. ..................... 156/359; 156/380.9; 156/499

(58) Field of Classification Search ................. 156/359, 156/380.9, 499; 347/171, 172
See application file for complete search history.

(56) References Cited

U.S. PATENT DOCUMENTS

| | | | | |
|---|---|---|---|---|
| 4,468,274 | A | 8/1984 | Adachi | 156/320 |
| 5,614,928 | A | 3/1997 | Matsuda | 347/2 |
| 5,724,085 | A * | 3/1998 | Inui et al. | 347/175 |
| 6,031,553 | A | 2/2000 | Nagamoto et al. | 347/171 |
| 6,053,231 | A | 4/2000 | Matsuguchi | 156/378 |
| 6,298,894 | B1 | 10/2001 | Nagamoto et al. | 156/359 |
| 6,850,262 | B2 * | 2/2005 | Yoshida et al. | 347/171 |
| 2003/0189631 | A1 | 10/2003 | Hoshino et al. | |
| 2004/0119809 | A1 * | 6/2004 | Yoshida et al. | 347/220 |

FOREIGN PATENT DOCUMENTS

| | | |
|---|---|---|
| EP | 1354718 | 10/2003 |

OTHER PUBLICATIONS

Patent Abstracts of Japan vol. 2000, No. 19, Jun. 5, 2001 & JP 2001 048139 A (Teraoka Seiko Co Ltd), Feb. 20, 2001.

* cited by examiner

*Primary Examiner*—George R Koch, III
(74) *Attorney, Agent, or Firm*—Adams & Wilks

(57) ABSTRACT

A thermal activation device has a thermal head and a platen roller that is in contact with an upwardly inclined surface of the thermal head and that is rotationally driven to convey a heat-sensitive adhesive sheet along the upwardly inclined surface between the thermal head and the platen roller while the thermal head thermally activates a heat-sensitive adhesive layer of the heat-sensitive adhesive sheet. A discharge roller is positioned downstream of the platen roller with a part of an outer circumference of the discharge roller above the level at which the heat-sensitive adhesive sheet exits from between the thermal head and the platen roller. The discharge roller is rotationally driven to convey the heat-sensitive adhesive sheet on the outer circumference of the discharge roller to a discharge port. A discharge guide is positioned above the discharge roller, and spaced from the discharge roller a distance larger than a thickness of the heat-sensitive adhesive sheet, to guide the heat-sensitive adhesive sheet onto the discharge roller. The discharge roller is configured such that a part of the roller outer circumference thereof is offset by 0.3 mm or more to the platen roller side from a reference plane obtained by extending a head surface of the thermal head.

20 Claims, 3 Drawing Sheets

THERMAL ACTIVATION DEVICE

BACKGROUND OF THE INVENTION

1. Field of the Invention

The present invention relates to a thermal activation device which heats a heat-sensitive adhesive sheet to activate an adhesive layer thereof, and to a technique for stably discharging the activated heat-sensitive adhesive sheet.

2. Description of the Related Art

A heat-sensitive adhesive label is anticipated for use as a label pasted on a product produced/marketed in a food factory or a supermarket for indicating, for example, a trade name, a price, a use-by date, and the like. The heat-sensitive adhesive label has an adhesive layer which does not have an adhesive force in a normal state. This adhesive layer is activated by application of heat energy to this adhesive layer, making it possible to paste it on an object. Moreover, on an upper surface side of the heat-sensitive adhesive label, a printing surface which develops color when heated is formed. Including such a heat-sensitive adhesive label, a sheet having a similar adhesive layer is generically referred to as a heat-sensitive adhesive sheet in this specification.

Patent Document 1-- JP2001-48139

Patent Document 2-- JP2003-316265

Here before, as a thermal activation device which activates such a heat-sensitive adhesive sheet, a "label issuing device" described in Patent Document 1 and the like have been proposed.

Moreover, as described in Patent Document 2, a thermal activation device has also been proposed, which uses a thermal head composed of heat generating elements formed on a planer substrate surface in a width direction thereof, and a platen roller brought into press-contact with this thermal head, and which is adapted to activate the adhesive layer of the heat-sensitive adhesive sheet by sandwiching the adhesive sheet between the thermal head and the platen roller and heating the adhesive sheet.

However, the conventional device described above does not have a structure which forcibly separates the heat-sensitive adhesive sheet from between the thermal head and the platen roller after the heat-sensitive adhesive sheet is thermally activated, and accordingly, the trailing end portion of the heat-sensitive adhesive sheet discharged from a discharge port is in contact with the thermal head. Then, when such a state continues for a predetermined period of time, the following problems occur. That is, residual heat remaining in the thermal head may be transferred to the trailing end portion of the heat-sensitive adhesive sheet, resulting in the printing surface of the portion developing color, and the adhesive layer may be solidified, resulting in sticking of the heat-sensitive adhesive sheet to the head.

In this connection, the inventors of the present invention examined the following mechanism as the structure which forcibly separates, from the thermal head, a heat-sensitive adhesive sheet that has been thermally activated. Specifically, in the mechanism, a conveyor roller that is rotationally driven is situated rearward of the thermal head and the platen roller, and a space large enough for the heat-sensitive adhesive sheet to pass therethrough is provided above this conveyor roller (see a discharge roller 56 and a discharge guide 57 in FIG. 1)

In such a way, the heat-sensitive adhesive sheet is conveyed with its one side supported, and thus the contact pressure of the heat-sensitive adhesive sheet and the conveyor roller becomes the minimum. Thus, the above mechanism advantageously reduces the occurrence of such a problem in which a part of the adhesive layer of the heat-sensitive adhesive sheet is adhered to the conveyor roller. Moreover, the interval above the conveyor roller can be set relatively large, and accordingly, the above mechanism also has an advantage in that, even if an adhesive material adheres to the conveyor roller and then accumulates, the mechanism is less prone to such a problem in which the path of the heat-sensitive adhesive sheet is blocked owing to accumulation of this adhesive material.

However, it has been found that, with the construction in which the conveyor roller that conveys the heat-sensitive adhesive sheet while supporting one side thereof is situated rearward of the thermal head and the platen roller in such a way, a problem occurs once in a while in which the heat-sensitive adhesive sheet slides on the conveyor roller and the trailing end portion of the heat-sensitive adhesive sheet cannot be separated from the thermal head.

An object of the present invention is to provide a thermal activation device including a discharge mechanism which forcibly separates, from a thermal head, an adhesive sheet that has been thermally activated and conveys the adhesive sheet, the thermal activation device realizing discharge of the adhesive sheet in a stable state while minimizing adhesion of an adhesive material to the discharge mechanism and the influence of such adhesion.

SUMMARY OF THE INVENTION

To attain the above object, according to the present invention, there is provided a thermal activation device,that has a thermally activating section which includes a thermal head having heat generating elements formed on a substrate, and a platen roller brought into press-contact with the thermal head, the thermally activating section being adapted to activate a heat-sensitive adhesive sheet, on which a heat-sensitive adhesive layer is provided, by heating the heat-sensitive adhesive sheet while passing the heat-sensitive adhesive sheet between the thermal head and the platen roller; and a discharge section which includes a conveyor (discharge) roller situated rearward of the thermal head and the platen roller and adapted to convey the heat-sensitive adhesive sheet that has been thermally activated while passing the heat-sensitive adhesive sheet over an upper side thereof, and driving means for rotationally driving the conveyor roller, in which a side of the conveyor roller over which the heat-sensitive adhesive sheet passes is formed as a hollow space larger than a thickness of the heat-sensitive adhesive sheet, the discharge section discharging the heat-sensitive adhesive sheet to an outside of the thermally activating device when a drive force is transmitted to the heat-sensitive adhesive sheet from a lower surface side thereof by rotationally driving the conveyor roller, wherein the conveyor roller is arranged such that a part of a roller outer circumference of the conveyor roller projects toward a side on which the platen roller is present from a reference plane obtained by extending a head surface of the thermal head.

By such means, when the heat-sensitive adhesive sheet is conveyed, in addition to the self weight of the heat-sensitive adhesive sheet and the adhesive force thereof, a pressure generated by the force of stiffness of the heat-sensitive adhesive sheet, which passes from the thermal head to the conveyor roller, is applied to the conveyor roller. Specifically, the frictional force between the conveyor roller and the heat-sensitive adhesive sheet becomes somewhat larger in comparison with the case where the above-described offset is not provided.

Moreover, the heat-sensitive adhesive sheet is pulled obliquely upward by the conveyor roller with respect to the head surface of the thermal head (that is, a substrate surface on a side on which the head is provided) due to the above-described offset. The frictional force increases when the heat-sensitive adhesive sheet is brought into surface contact with the head surface of the thermal head and pulled in the direction along the head surface. When the heat-sensitive adhesive sheet is pulled obliquely upward with respect to the head surface, the frictional force weakens. Hence, as described above, the obliquely upward force is applied to the heat-sensitive adhesive sheet, and thus the frictional force between the heat-sensitive adhesive sheet and the head surface is reduced.

Due to these actions, in comparison with the case where the above-described offset is not provided, the heat-sensitive adhesive sheet can be stably separated from the thermal head, and can be conveyed to the discharge section. Moreover, the frictional force between the heat-sensitive adhesive sheet and the head surface is reduced. Thus, the stress generated on the contact surface of the conveyor roller and the heat-sensitive adhesive sheet upon separating the heat-sensitive adhesive sheet from the thermal head is reduced. Thus, the problem of a part of the adhesive layer of the heat-sensitive adhesive sheet being adhered to the conveyor roller can be mitigated.

Specifically, it is desirable to place the conveyor roller such that a rotation centerline thereof lies on a side on which the substrate of the thermal head is present with respect to the reference plane.

In the case where the amount of the above-described offset is increased and the center of the conveyor roller is located above the extension plane of the head surface, the heat-sensitive adhesive sheet is sent to a lower side of the conveyor roller when the leading end portion of the heat-sensitive adhesive sheet is sent from the thermal head. Accordingly, smooth conveyance of the heat-sensitive adhesive sheet may become hindered. This problem can be avoided with the above-described configuration.

Specifically, it is desirable that the part of the roller outer circumference of the conveyor roller be arranged to project toward the side on which the platen roller is present from the reference plane by at least 0.3 mm or more.

Further, it is desirable that the roller outer circumference of the conveyor roller crosses the reference plane at a side of a discharge end of the head surface of the thermal head, and is located below a first virtual plane inclined upward of the conveyor roller at 12° with respect to the reference plane.

Further, it is desirable that the conveyor roller be arranged such that a distance between the rotation centerline of the conveyor roller and a second virtual plane that orthogonally crosses the reference plane at the side of the discharge end of the head surface of the thermal head comes within a range of R to R+11 mm with respect to a radius R of the conveyor roller.

With such placement, a discharge operation of the heat-sensitive adhesive sheet can be performed more stably.

According to the present invention, after the thermal activation, the adhesive sheet can be forcibly separated from the thermal head and can be conveyed to the discharge port by the conveyor roller situated rearward of the thermal head and the platen roller. Moreover, the pressure applied to the conveyor roller and the heat-sensitive adhesive sheet can be reduced, thus making it possible to minimize the adhesion of the adhesive material to the conveyor roller.

Furthermore, placing the conveyor roller as described in the present invention advantageously eliminates such a problem in which the conveyor roller idles owing to the frictional resistance between the heat-sensitive adhesive sheet and the thermal head to disable conveyance of the heat-sensitive adhesive sheet, thus making it possible to always perform stable discharge processing.

BRIEF DESCRIPTION OF THE DRAWINGS

For a more better understanding of the present invention, reference is made of a detailed description to be read in conjunction with the accompanying drawings, in which.

DETAILED DESCRIPTION OF THE PREFERED EMBODIMENT

Figure 1:
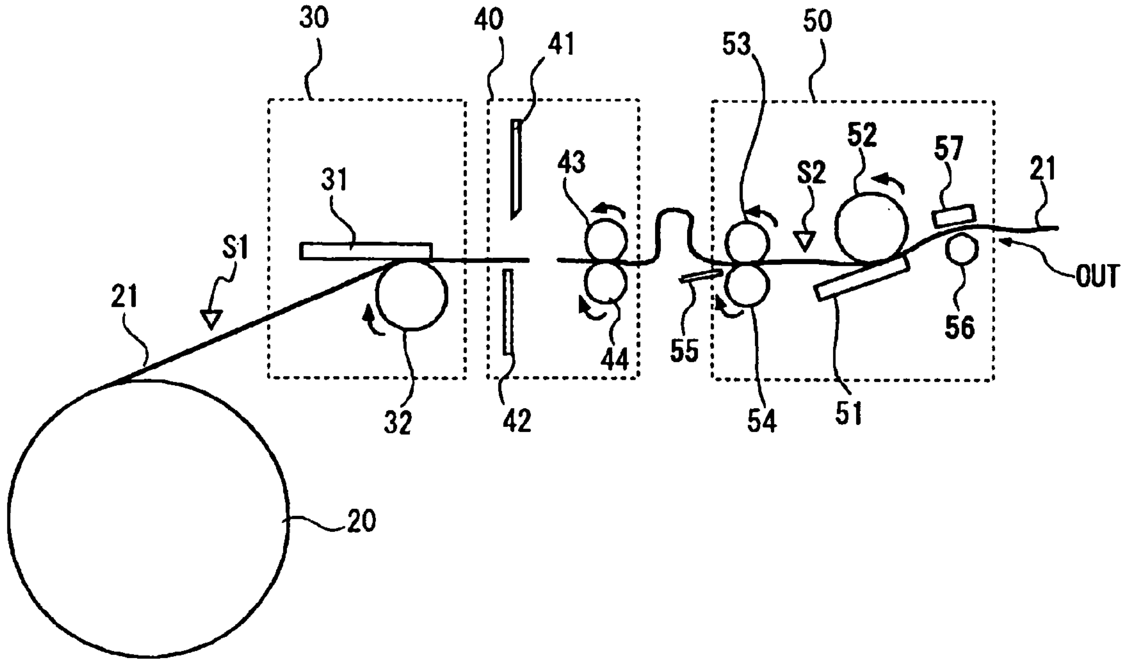
FIG. 1 is a view showing a general construction of a printer apparatus according to an embodiment of the present invention.

An embodiment of the present invention is described below based on the drawings.

The printer apparatus of this embodiment is an apparatus which performs, with respect to a heat-sensitive adhesive sheet 21 composed of a heat-sensitive printable layer formed on one surface of a sheet base material and a heat-sensitive adhesive layer formed on the other surface, printing on the printing surface, cutting of the sheet 21 into a predetermined length, and thermal activation of the adhesive layer, before discharging the sheet 21. This printer apparatus is composed of a printing unit 30 which performs printing on the heat-sensitive adhesive sheet 21 while sandwiching the sheet 21 between a line thermal head 31 and a platen roller 32, a cutting unit 40 which cuts the continuous heat-sensitive adhesive sheet 21 by pinching the sheet 21 with, for example, a pair of blades 41 and 42, and a thermal activation unit 50 which heats up and activates the adhesive layer of the sheet 21.

The heat-sensitive adhesive sheet 21 is housed in a container of the printer apparatus in a rolled state as roll paper 20. The heat-sensitive adhesive sheet 21 needs to be discharged to the outside of the apparatus with the printing surface facing up. Accordingly, the thermal head 31 of the printing unit 30 is provided on an upper side of the sheet 21, and the platen roller 32 is provided on a lower side. On the contrary, in the thermal activation unit 50, a platen roller 52 is provided on the upper side, and a thermal head 51 which heats up the adhesive layer is provided on the lower side.

In the cutting unit 40, a pair of delivery rollers 43 and 44 are provided on a discharge side of the sheet 21 in addition to the pair of blades 41 and 42. While being sandwiched between the delivery rollers 43 and 44, the heat-sensitive adhesive sheet 21 is carried to the thermal activation unit 50 situated rearward thereof. Note that the heat-sensitive adhesive sheet 21 may be carried from the cutting unit 40 to the thermal activation unit 50 by utilizing sheet conveying force by the printing unit 30 without providing the delivery rollers 43 and 44.

Moreover, in this printer apparatus, detectors S1 and S2 such as photo sensors, which detect the existence of the sheet 21 before an entrance of the printing unit 30 and before the thermal head 51 of the thermal activation unit 50, are provided.

Figure 2:
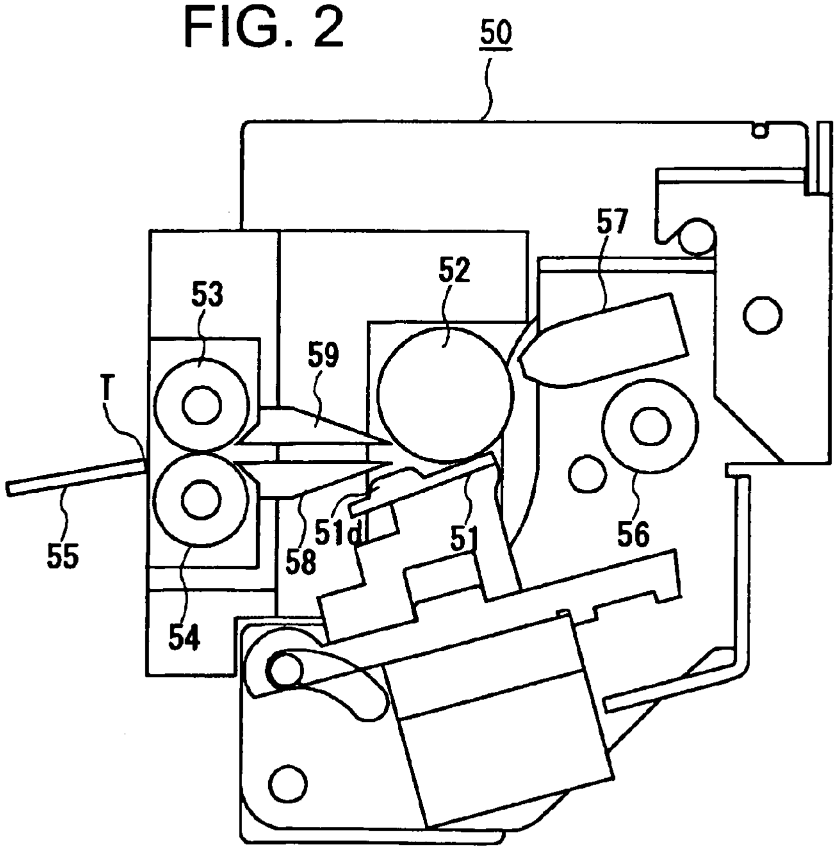
FIG. 2 is a side view showing the interior of a thermal activation unit of FIG. 1 in detail.

FIG. 2 shows a detailed internal side view of the thermal activation unit 50.

The thermal activation unit 50 includes the thermal head 51 which heats a side of the heat-sensitive adhesive sheet on which the adhesive layer is provided; the platen roller 52 which presses the heat-sensitive adhesive sheet 21 against the thermal head 51; an insertion guide 55 which guides the heat-sensitive adhesive sheet 21 from the cutting unit 40 to the thermal activation unit 50; a pair of insertion rollers 53 and 54 which deliver the carried heat-sensitive adhesive sheet 21 into the unit 50 while sandwiching the sheet 21 therebetween; guides 58 and 59 which guide the delivered heat-sensitive adhesive sheet 21 to a press-contact portion of the thermal head 51 and the platen roller 52; a discharge (conveyor) roller 56 serving as a conveyor roller which passes the thermally activated heat-sensitive adhesive sheet 21 over an upper side thereof and conveys the sheet 21 to a discharge port; a discharge guide 57 which is placed on the upper side of the discharge roller 56 with a sufficient gap for the heat-sensitive adhesive sheet to pass therethrough; stepping motors serving as driving means for rotationally driving the platen roller 52, the insertion roller 53, and the discharge roller 56; and the like. The thermal head 51 and the platen roller 52 constitute a thermally activating section, and the discharge roller 56 and the discharge guide 57 constitute a discharge section.

Figure 3:
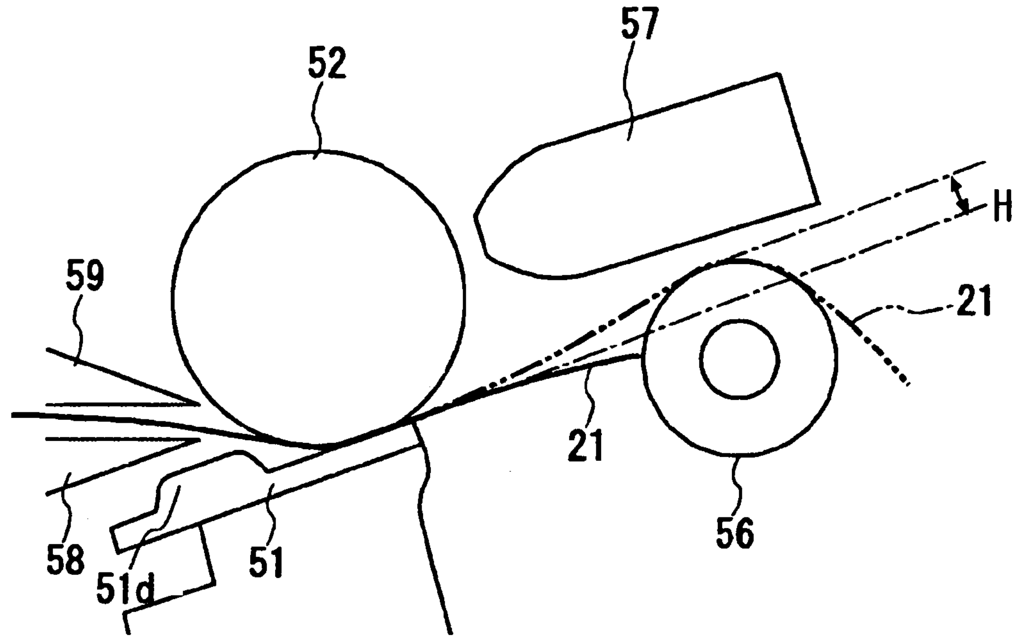
FIG. 3 is a side view showing a thermally activating section and a discharge section of the thermal activation unit of FIG. 2 in detail.

FIG. 3 is a side view showing the thermally activating section and discharge section of the thermally activating unit in detail.

The thermal head 51 is composed of heat generating elements formed on a plate-like substrate in a width direction. The heat generating elements are formed on a portion of an upper surface of the substrate, where the platen roller 52 is brought into press contact. In the substrate of the thermal head 51, a surface on a side on which the heat generating elements are provided is referred to as a head surface. Note that a sealing section 51*d* formed by sealing a drive chip for the heat generating elements is provided on a front side of the head surface, rising a little from the surface.

The heat-sensitive adhesive sheet 21 is sent between these thermal head 51 and platen roller 52 with the printing surface facing up and a heat-sensitive adhesive surface facing down, and is then conveyed by rotation of the platen roller 52 with the adhesive surface sliding on a heat-generating region of the thermal head 51. Thus, the adhesive layer of the heat-sensitive adhesive sheet 21 is activated and becomes adhesive, and the adhesive sheet 21 in this state is sent out along the head surface of the thermal head 51.

Note that, in the thermal activation unit 50 of this embodiment, the heat-sensitive adhesive sheet 21 is delivered in the horizontal direction from the cutting unit 40 situated forward thereof, and is adapted to detour around the rising portion of the sealing section 51*d* before the thermal head 51. Accordingly, the head surface of the thermal head 51 is not horizontal but upwardly inclined such that a side where the adhesive sheet is sent out becomes a little higher.

The discharge roller 56 is not particularly limited, but is formed of a member such as a fluorine resin and silicone resin having low surface energy. Moreover, unevennesses are formed on a surface of the discharge roller 56 so as to reduce a contact area thereof with the heat-sensitive adhesive sheet 21. More specifically, for example, the discharge roller 56 is configured by fitting a plurality of O-rings ("O"-shaped rings) made of silicone rubber onto a rotating shaft member at a predetermined interval. With such a configuration, a part of the activated adhesive layer of the heat-sensitive adhesive sheet 21 does not easily adhere to the discharge roller 56.

The discharge roller 56 is arranged such that the rotation centerline thereof is orthogonal to the conveying direction of the heat-sensitive adhesive sheet 21 and parallel to the sheet surface of the heat-sensitive adhesive sheet 21, like the width direction of the thermal head 51 along which the heat generating elements are formed and the rotation centerline of the platen roller 52.

As shown in FIG. 3, the rotation centerline of the discharge roller 56 is arranged on the side where the thermal head 51 is present with respect to a plane (hereinafter referred to as a reference plane H) obtained by extending the head surface of the thermal head 51. Meanwhile, a part of an outer circumference of the discharge roller 56 is arranged so as to be offset to the side where the platen roller 52 is present with respect to the reference plane H. The optimum placement of the discharge roller 56 is described later in detail.

The discharge guide 57 is a fixed, stationary member having a guide surface which extends along and covers the path of travel of the heat-sensitive adhesive sheet 21 from one side, and is provided above the discharge roller 56 at a position spaced from the roller surface of the discharge roller 56 by, for example, an interval of 0.5 to 2 mm. This gap is wider than the thickness and extends across the width of the heat-sensitive adhesive sheet 21 and is large enough to allow the heat-sensitive adhesive sheet 21 to pass therethrough as it is.

A guide surface of the discharge guide 57 is inclined at an angle substantially similar to that of the head surface of the thermal head 51, and is adapted to be capable of guiding the heat-sensitive adhesive sheet 21 sent from the thermal head 51 into the gap between the discharge roller 56 and the discharge guide 57 without nipping the heat-sensitive adhesive sheet therebetween and without largely changing the inclination of the heat-sensitive adhesive sheet 21.

Moreover, the discharge guide 57 has a role of preventing the heat-sensitive adhesive sheet 21 from falling off from the discharge port by engaging the trailing end side of the heat-sensitive adhesive sheet 21 after the trailing end of the heat-sensitive adhesive sheet 21 is separated from the thermal head 51.

Next, a discharge operation by the discharge roller 56 and the discharge guide 57 constructed as described above is described.

As shown in FIG. 3, when the leading end of the heat-sensitive adhesive sheet 21 is sent from the thermal head 51, first, the leading end of the heat-sensitive adhesive sheet 21 abuts on the discharge roller 56 at a position a little lower than the reference plane H owing to the self weight thereof. At this time, the discharge roller 56 is rotationally driven clockwise, guides the leading end of the heat-sensitive adhesive sheet 21 to the upper side of the discharge roller 56, and conveys the leading end to the discharge port.

Subsequently, by the rotation drives of the platen roller 52 and the discharge roller 56, the heat-sensitive adhesive sheet 21 is sent as it is, and a portion from the leading end of the heat-sensitive adhesive sheet 21 to an intermediate portion thereof is exposed to the discharge port.

Thereafter, when the trailing end portion of the heat-sensitive adhesive sheet 21 arrives at the gap between the thermal head 51 and the platen roller 52 and passes there, the conveying force transmitted from the platen roller 52 to the heat-sensitive adhesive sheet 21 disappears, and the only conveying force that acts on the heat-sensitive adhesive sheet 21 is the one transmitted from the discharge roller 56.

Here, the discharge roller 56 is offset upward from the reference plane H. Thus, applied between the discharge roller 56 and the heat-sensitive adhesive sheet 21 is a pressure caused by the force of stiffness of the heat-sensitive adhesive sheet 21 between the thermal head 51 and the discharge roller 56 in addition to the self weight of the heat-sensitive adhesive sheet 21 and the adhesive force thereof. By this pressure, the frictional force between the discharge roller 56 and the heat-sensitive adhesive sheet 21 is slightly increased in comparison with the case where the above-described offset is not provided.

Moreover, due to the fact that the discharge roller 56 is offset, the trailing end portion of the heat-sensitive adhesive sheet 21 is pulled not in the direction along the head surface of the thermal head 51 but somewhat obliquely with respect to the head surface. Thus, the frictional resistance between the heat-sensitive adhesive sheet 21 and the thermal head 51 is reduced.

Figure 4:
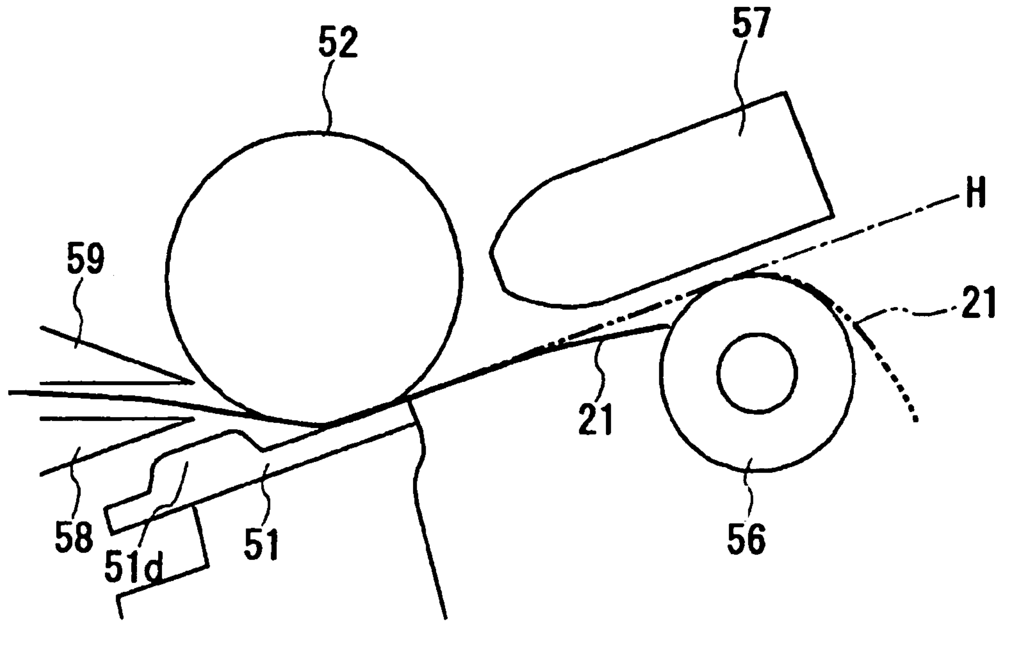
FIG. 4 is a side view showing a case when an offset of a discharge roller is set at "0" for a comparison.

FIG. 4 is a view showing how the adhesive sheet is sent when the offset of the discharge roller is set at "0" for a comparison.

As understood by comparing FIG. 3 and FIG. 4 with each other, as compared with the case (FIG. 4) where the discharge roller 56 is not offset, in the case (FIG. 3), where it is offset, the pressure applied to the discharge roller 56, which is caused by the force of stiffness of the heat-sensitive adhesive sheet 21, is increased, and the frictional resistance on the trailing end portion of the heat-sensitive adhesive sheet 21, which remains at the forward end of the thermal head 51, is reduced.

Then, owing to these actions, the trailing end portion of the heat-sensitive adhesive sheet 21 is stably separated from the thermal head 51, and is conveyed to the discharge port. Note that, after the heat-sensitive adhesive sheet 21 is separated from the thermal head 51, the discharge roller 56 is stopped when the trailing end of the adhesive sheet 21 comes to a position slightly upstream from the discharge roller 56. Thus, the heat-sensitive adhesive sheet 21 is inclined owing to the self weight, and the trailing end portion of the adhesive sheet 21 abuts on the discharge guide 57. Then, the adhesive sheet 21 is held in this state.

The placement of the discharge roller 56, which makes it possible to stably convey/discharge the heat-sensitive adhesive sheet 21, is described below in detail.

Figure 5:
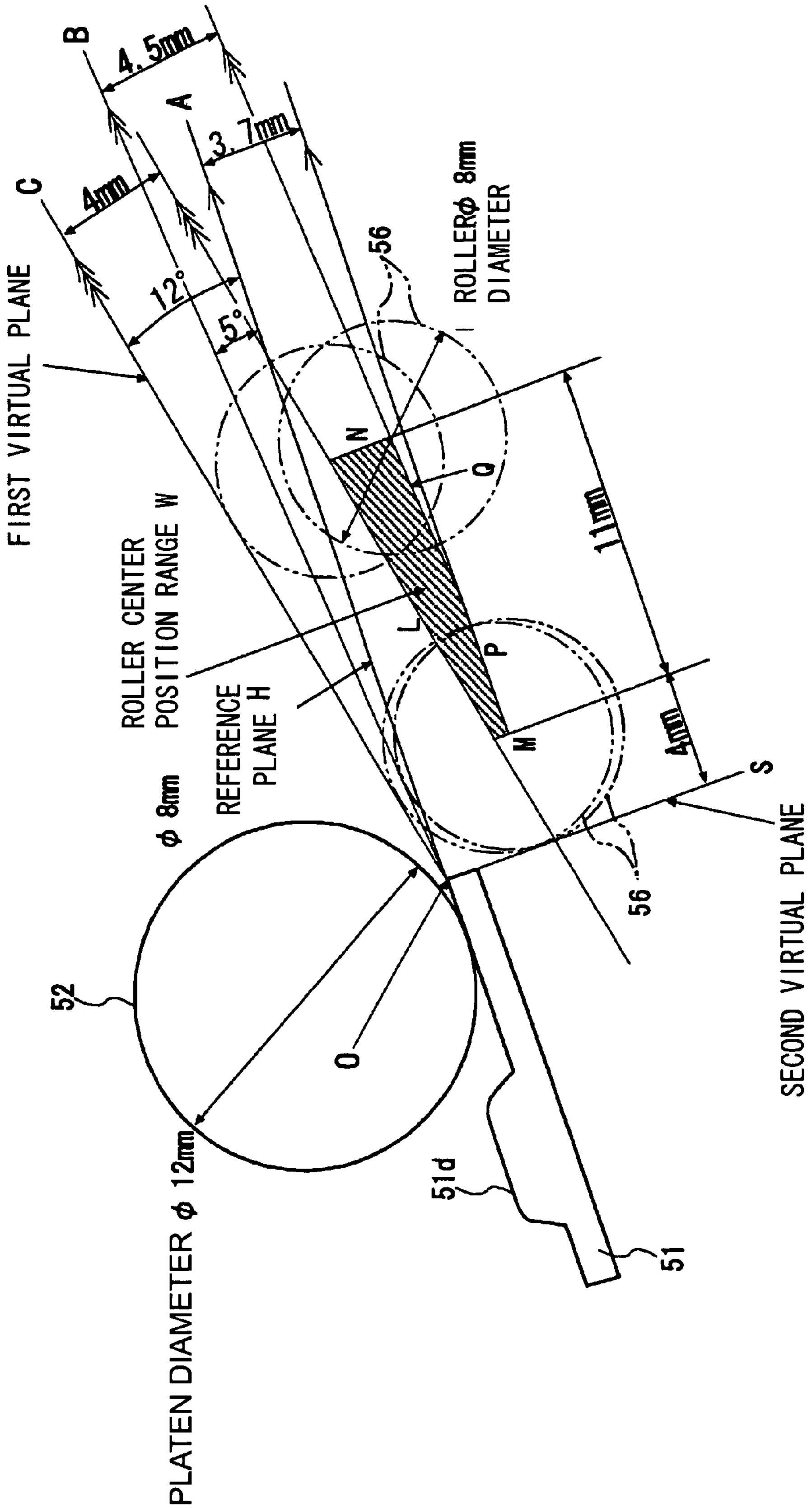
FIG. 5 is a view explaining an optimum placement range of a conveyor roller.

FIG. 5 is a view explaining the optimum placement range of the discharge roller 56.

In this drawing, symbol O denotes an end point of the head surface of the thermal head 51 on the side from which the sheet is sent out, and a straight line OA is a straight line along the reference plane H obtained by extending the head surface.

When viewed from the axial direction of the platen roller 52, the placement of the discharge roller 56 with respect to the thermal head 51 is such that the center of the discharge roller 56 is located within a range W of FIG. 5 (in FIG. 5, the discharge roller 56 whose center lies within the range W is shown by two-dotted lines). Thus, it was confirmed through an experiment that the heat-sensitive adhesive sheet 21 can be smoothly guided to the upper side of the discharge roller 56, and there is little problem of the heat-sensitive adhesive sheet 21 remaining on the discharge roller 56 without being separated therefrom.

Here, the above-described range W is a range surrounded by the following straight lines, L, M, N, P and Q.

Straight line L: a straight line, which is parallel to a straight line OC drawn by inclining the straight line OA by 12° with the end point O taken as the center, and is located below this straight line OC, with the distance between the straight line L and this straight line OC being equal to the length (4 mm in FIG. 5) of the radius of the discharge roller 56. By locating the center of the discharge roller 56 below the straight line OC, the outer circumference of the discharge roller 56 is located below the straight line OC representing a first virtual plane.

Straight line M: a straight line, which is located on the adhesive sheet 21 discharging side with respect to a straight line OS (a straight line representing a second virtual plane) that orthogonally crosses the straight line OA at the end point O, with the distance between the straight line M and the straight line OS being equal to the length (4mm) of the radius of the discharge roller 56. If the center of the discharge roller 56 is positioned forward or upstream of this straight line M, the discharge roller 56 and the thermal head 51 become too close to each other, resulting in an increase in assembly steps and the difficulty of maintenance work. However, the center of the discharge roller 56 is located rearward or downstream of this straight line M, thus making it possible to avoid such a disadvantage as described above.

Straight line N: a straight line, which is located on the adhesive sheet 21 discharging side with respect to the above-described straight line OS (the straight line representing the second virtual plane), and is arranged at a distance of 15 mm from this straight line OS (a length obtained by adding the radius of the roller to 11 mm). If the center of the discharge roller 56 is located rearward or upstream of this straight line N, the discharge roller 56 and the thermal head 51 become too spaced apart from each other, resulting in fading of the effect obtained by offsetting the discharge roller 56 upward owing to deflection of the adhesive sheet 21. Moreover, if an amount of the offset of the discharge roller 56 is increased while this distance is being kept, it becomes somewhat difficult to send the adhesive sheet 21 to the upper side of the discharge roller 56. Hence, the center of the discharge roller 56 is located forward or downstream of the straight line N, thus making it possible to avoid the above-described problem.

Straight line P: a straight line, which is parallel to the straight line OA and located below the straight line OA at a distance of 3.7 mm from the straight line OA (a length obtained by subtracting 0.3 mm from the radius of the roller). The center of the discharge roller 56 is positioned above this straight line P, and thus at least a part of the roller outer circumference of the discharge roller 56 projects toward the platen roller 52 side from the reference plane H by 0.3 mm or more.

Straight line Q: a straight line, which is parallel to a straight line OB drawn by inclining the straight line OA by 5° with the end point O taken as the center, and is located below this straight line OB at a distance to the straight line OB of 4.5 mm (a length obtained by adding 0.5 mm to the radius of the roller). The center of the discharge roller 56 is positioned above this straight line Q. Thus, compensation is made such that the lower limit of the discharge roller 56 becomes higher in position within a range where the distance between the discharge roller 56 and the thermal head 51 is increased.

Note that the range W in FIG. 5 is one in the case where the roller diameter of the discharge roller 56 is 8 mm. In the case of using a discharge roller of which diameter varies in the vicinity of 8 mm, the actual diameter of the discharge roller to be used is applied to replace what is indicated as the radius of the discharge roller in the above description, thus making it possible to obtain the optimum placement range applicable to the discharge roller concerned.

As described above, according to the printer apparatus and the thermal activation unit 50 of this embodiment, after the thermal activation, the heat-sensitive adhesive sheet 21 can be forcibly separated from the thermal head 51 and conveyed to the discharge port by the discharge roller 56 situated rearward or downstream of the thermal head 51 for thermal activation and the platen roller 52. Moreover, the heat-sensitive adhesive sheet 21 is supported only on one side, and the pressure applied to the discharge roller 56 and the heat-sensitive adhesive sheet 21 is reduced, thus making it possible to minimize the adhesion of the adhesive material to the discharge roller 56.

Furthermore, the discharge roller 56 is placed in the above-described manner. Thus, there is eliminated such a problem in which the discharge roller 56 idles owing to the frictional resistance between the heat-sensitive adhesive sheet 21 and the thermal head 51, disabling separation of the heat-sensitive adhesive sheet 21 from the thermal head 51. A stable discharge operation can always be performed.

Note that the present invention is not one limited to the above-described embodiment, and various alterations are possible. For example, the range W shown in the embodiment within which the center of the discharge roller 56 is arranged shows the optimum range that allows stable discharge processing, and the placement of the discharge roller 56 is not limited to one based on this range W. For example, even if the discharge roller 56 is placed such that the roller outer circumference of the discharge roller 56 projects a little upward from the straight line OC of FIG. 5, the stable discharge operation can be obtained in a similar way.

Moreover, when the diameter of the discharge roller 56 is enlarged so as to facilitate guiding of the adhesive sheet 21 to the upper side of the roller, the stable discharge operation can be obtained in a similar way even when the distance between the discharge roller and the thermal head is slightly increased or displacing the discharge roller is displaced slightly upward.

What is claimed is:

1. A thermal activation device comprising:

a thermally activating section which includes a thermal head having heat generating elements formed on a substrate, and a platen roller brought into press-contact with the thermal head, the thermally activating section being adapted to activate a heat-sensitive adhesive sheet, on which a heat-sensitive adhesive layer is provided, by heating the heat-sensitive adhesive sheet while passing the heat-sensitive adhesive sheet between the thermal head and the platen roller; and a discharge section which includes a discharge roller situated downstream of the thermal head and the platen roller and that conveys the thermally activated heat-sensitive adhesive sheet with one side thereof supported on an upper side of the discharge roller a discharge guide positioned above and spaced from the discharge roller to define a gap therebetween that is larger than a thickness of the heat-sensitive adhesive sheet and adapted to guide the heat-sensitive adhesive sheet into the gap between the discharge roller and the discharge guide without nipping the heat-sensitive adhesive sheet between the discharge guide and the discharge roller, and driving means for rotationally driving the discharge roller, the discharge section discharging the heat-sensitive adhesive sheet to outside the thermal activation device when a drive force is transmitted to the heat-sensitive adhesive sheet from a lower surface side thereof by rotationally driving the discharge roller, and the discharge roller being arranged such that a part of a roller outer circumference of the discharge roller projects toward a side on which the platen roller is present from a reference plane obtained by extending a head surface of the thermal head.

2. A thermal activation device according to claim 1; wherein the part of the roller outer circumference of the discharge roller is arranged to project toward the side on which the platen roller is present from the reference plane by at least 0.3 mm or more.

3. A thermal activation device according to claim 2; wherein the discharge roller is arranged such that a rotation centerline thereof lies on a side on which the substrate of the thermal head is present with respect to the reference plane.

4. A thermal activation device according to claim 3; wherein the roller outer circumference of the discharge roller crosses the reference plane at a side of a discharge end of the head surface of the thermal head, and is located below a first virtual plane inclined upward of the discharge roller at 120 with respect to the reference plane.

5. A thermal activation device according to claim 4; wherein the discharge roller is arranged such that a distance between the rotation centerline of the discharge roller and a second virtual plane that orthogonally crosses the reference plane at the side of the discharge end of the head surface of the thermal head comes within a range of R to R+11 mm with respect to a radius R of the discharge roller.

6. A thermal activation device according to claim 1; wherein the roller is arranged such that a rotation centerline thereof lies on a side on which the substrate of the thermal had is present with respect to the reference plane.

7. A thermal activation device according to claim 6; wherein the roller outer circumference of the discharge roller crosses the reference plane at a side of a discharge end of the head surface of the thermal head, and is located below a first virtual plane inclined upward of the discharge roller at 12° with respect to the reference plane.

8. A thermal activation device according to claim 7; wherein the discharge roller is arranged such that a distance between the rotation centerline of the discharge roller and a second virtual plane that orthogonally crosses the reference plane at the side of the discharge end of the head surface of the thermal head comes within a range of R to R+11 mm with respect to a radius R of the discharge roller.

9. A thermal activation device according to claim 3; wherein the discharge roller is arranged such that a distance between the rotation centerline of the discharge roller and a second virtual plane that orthogonally crosses the reference plane at the side of the discharge end of the head surface of the thermal head comes within a range of R to R+11 mm with respect to a radius R of the discharge roller.

10. A thermal activation device according to claim 1; wherein the discharge roller is arranged such that a distance between the rotation centerline of the discharge roller and a second virtual plane that orthogonally crosses the reference plane at the side of the discharge end of the head surface of the thermal head comes within a range of R to R+11 mm with respect to a radius R of the discharge roller.

11. A thermal activation device according to claim 1; wherein the discharge guide comprises a stationary discharge guide.

12. A thermal activation device according to claim 1; wherein the discharge guide has a guide surface that extends above and lengthwise along a path along which the heat-sensitive adhesive sheet travels as it passes from the thermally activating section to the discharge roller.

13. A thermal activation device, comprising: a thermal head having an upwardly inclined surface; a rotationally driven platen roller that makes contact with the upwardly inclined surface of the thermal head and that conveys a heat-sensitive adhesive sheet along the upwardly inclined surface between the thermal head and the platen roller while the thermal head thermally activates a heat-sensitive adhesive layer of the heat-sensitive adhesive sheet; a rotationally driven discharge roller that is positioned downstream of the platen roller with a part of an outer circumference of the discharge roller above the level at which the heat-sensitive adhesive sheet exits from between the thermal head and the platen roller and that conveys the heat-sensitive adhesive sheet with one side thereof supported on the outer circumference of the discharge roller to a discharge port; and a discharge guide that is positioned above the discharge roller, and spaced from the discharge roller a distance larger than a thickness of the heat-sensitive adhesive sheet, and that is adapted to guide the heat-sensitive adhesive sheet onto the discharge roller without nipping the heat-sensitive adhesive sheet between the discharge guide and the discharge roller.

14. A thermal activation device according to claim 13; wherein the upwardly inclined surface of the thermal head is planar and defines a reference plane, and the part of the outer circumference of the discharge roller projects above the reference plane a distance of 0.3 mm or more.

15. A thermal activation device according to claim 14; wherein a rotation axis of the discharge roller is located below the reference plane.

16. A thermal activation device according to claim 13; wherein the upwardly inclined surface of the thermal head is planar and defines a reference plane, and a rotation axis of the discharge roller is located below the reference plane.

17. A thermal activation device according to claim 16; wherein the outer circumference of the discharge roller is located below a virtual plane that is inclined upwardly at an angle of 12° with respect to the reference plane, the angle being measured from an end point of the upwardly inclined flat surface of the thermal head.

18. A thermal activation device according to claim 13; wherein the discharge guide is fixed and stationary.

19. A thermal activation device according to claim 18; wherein the discharge guide has a guide surface that extends above and lengthwise along a path of travel of the heat-sensitive adhesive sheet as it is conveyed from between the thermal head and the platen roller to the discharge roller.

20. A thermal activation device according to claim 19; wherein the guide surface of the discharge guide is inclined at an angle similar to the inclination of the upwardly inclined surface of the thermal head.

* * * * *